United States Patent [19]

Schonberger et al.

[11] B 3,998,614

[45] Dec. 21, 1976

[54] INTERNAL COMBUSTION ENGINE AIR INDUCTION ASSEMBLY

[75] Inventors: Helmut Schonberger, Ginsheim; Manfred Wolfsberger; Walter Funke, both of Russelsheim, all of Germany

[73] Assignee: General Motors Corporation, Detroit, Mich.

[22] Filed: Aug. 30, 1974

[21] Appl. No.: 502,151

[44] Published under the second Trial Voluntary Protest Program on March 23, 1976 as document No. B 502,151.

[30] Foreign Application Priority Data

Sept. 12, 1973 Germany .......................... 2345930

[52] U.S. Cl. .................................. 55/417; 55/276; 123/32 EA; 123/32 AE

[51] Int. Cl.² ........................................ B01D 27/08

[58] Field of Search ............ 55/276, 261, 270, 316, 55/417, 497, 498, 510; 123/32 EA, 32, 32 AE, 119 R, 139 AW; 261/50 A

[56] References Cited

UNITED STATES PATENTS

| | | | |
|---|---|---|---|
| 2,886,129 | 5/1959 | Streete | 55/276 |
| 3,530,648 | 9/1970 | Ravenel | 55/276 |
| 3,628,515 | 12/1971 | Knapp et al. | 123/119 R |
| 3,823,696 | 7/1974 | Mutschler et al. | 123/119 R |

FOREIGN PATENTS OR APPLICATIONS

| | | | |
|---|---|---|---|
| 1,340,660 | 9/1963 | France | 55/276 |
| 1,303,763 | 8/1962 | France | 55/276 |

OTHER PUBLICATIONS

Def. Pub. S.N. 775389 4/69, Hansen.

*Primary Examiner*—Bernard Nozick
*Attorney, Agent, or Firm*—K. H. McLean, Jr.

[57] ABSTRACT

An air induction assembly particularly for engines with electronically controlled fuel injection including an air volumeter for sensing air flow and an air-smoothing inlet means therefor in the form of a pipe or conduit having a length about three or four times its cross-sectional dimension.

1 Claim, 8 Drawing Figures

INTERNAL COMBUSTION ENGINE AIR INDUCTION ASSEMBLY

This invention relates to internal combustion engine air induction assemblies and in particular to induction assemblies in which an air filter (which may also act as a noise silencer) delivers air to an air volumeter connected thereto.

In electrically controlled fuel injection systems, it is known to provide a back-pressure valve serving as an air volumeter, in the induction pipe of the internal combustion engine. In opposition to a restoring force, this back-pressure valve is pivotable by the induction air stream about an axis at the edge of the induction passage. By way of a potentiometer, the back-pressure valve passes on signals to the electronic control of the fuel injection. In order that the data from the air volumeter may be kept as accurate as possible, it is essential that the incoming air should be kept as free as possible from troublesome eddies or turbulence effects. The turbulence formation takes place during the passage of induction air through the air filter or the outlet aperture. The air filter may serve at the same time as an induction air silencer and is placed upstream of the air volumeter. If, as is shown for example in German specification DOS 2 135 824/46b, 5–02, an appropriate induction pipe is used between filter and air volumeter as a means for homogenizing the air, a certain smoothing of the induction air flow takes place in this pipe until the back-pressure valve of the air volumeter is reached. In practice, the air volumeter of itself constitutes a compact housing in which the back-pressure valve lies near to the air inlet aperture.

It is a disadvantage to provide a pipe of a certain definite length between air filter and air volumeter, because the space for accommodating the parts in the engine compartment is limited. Such a pipe also means an additional expenditure as well as extra connections, which in turn involve more expenditure in assembly.

The present invention solves the problem of smoothing the air flow in front of the air volumeter in a space-saving and cost-saving manner by arranging that, according to the invention, the means for smoothing or steadying the air flow are arranged inside the air filter and the noise silencer, and the air volumeter with its back-pressure valve is connected directly at the outlet aperture of the air filter and silencer. The seal between the flow-smoothing pipe and the air volumeter must be effected with suitable means in such a way that no turbulence formation is created at the point of transition.

The means for homogenizing the air stream may, for example, take the form of air-guiding plates, laminations, or the like. The most suitable means, however, is a flow-smoothing pipe which extends from the outlet aperture of the air filter into the interior of the latter. It is of advantage to employ a conical pipe having a good inlet; e.g., in the form of a Laval nozzle which substantially avoids the creation of eddies and obviates a detachment of the flow from the pipe wall at the interior. To some extent, similar pipes are used as a so-called "Schnorkel" on air filters for directing the air into the filter housing.

Preferably, the flow-smoothing pipe does not merely serve for smoothing the air flow, but owing to the ratio between its diameter and its length, it also favorably influences the torque and the consumption of the engine. When there are resulting technical advantages from a production aspect, the pipe may have a square or rectangular cross-section instead of a round one, and in certain circumstances it is even possible to dispense with the conicity.

A favorable effect is attained from the flow-smoothing pipe, for example, if its length amounts to three or four times its diameter. Generally, the pipe will consist of the same material as the filter housing. It may be screwed on, or welded on to the filter housing as a separate part, or it may be clipped on as a plastics part. Again, the upper side of the pipe may continue into the upper wall of the filter housing or it may be formed together with the upper wall of the housing. Adoption of this latter measure is particularly appropriate in the case of a filter housing of plastics material which is produced along with the pipe in one working operation.

In the case of vehicle having an activated carbon container for vaporization control of the fuel, such as is already mandatory in some countries, the activated carbon container may be connected via a hose line or pipe line, to the flow-smoothing pipe, because the flow of air here gives rise to a correspondingly higher vacuum which may be utilized for drawing off the fuel vapors from the activated carbon container. This does not impair the accuracy of the air volumeter provided that the flow-smoothing pipe is made long enough and the branch connection is arranged near the inner end of the pipe; that is, sufficiently remote from the actual air volumeter.

Embodiments of the invention are explained in further detail with reference to the accompanying drawings in which.

Figure 1:
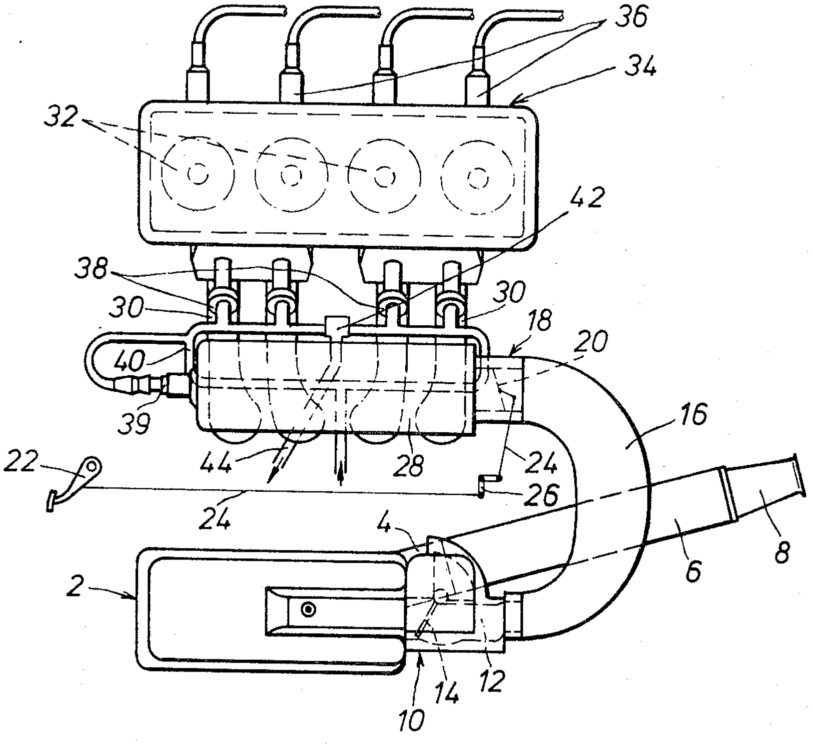
FIG. 1 is a schematic plan of the parts serving to supply the combustion air to the engine.

FIG. 1 shows an internal combustion engine having electronic fuel injection and an air filter and silencer 2 with an inlet spigot 4 which is connected to a tube 6 provided at its other end with a nozzle-like air induction pipe 8 which extends toward the radiator grille (not shown). An air volumeter 10 is connected to the air filter 2 obliquely above the inlet spigot 4 and has a back pressure valve 14 which is mounted at the edge of an induction passage 12 and cooperates with a resistance by means of a lever arm attached to the valve. Connected to the outlet of the air volumeter 10 is one end of a curved air delivery hose 16 the other end of which is connected to a throttle branch pipe 18 in which is arranged a throttle valve 20, actuated from an accelerator pedal 22 by way of a linkage 24 and a cranked lever 26. The throttle branch pipe 18 is connected to an induction manifold 28 on which is arranged a cold start valve 39 and from which passages 30 lead to cylinders 32 of the engine 34, the spark plugs of which are shown at 36. Injection valves 38 open into the passages 30 near the engine 34, each of the injection valves 38 and the cold start valve 39 being connected to a fuel line 40 on which is a pressure regulator 42 from which a return line 44 branches off.

Figure 2:
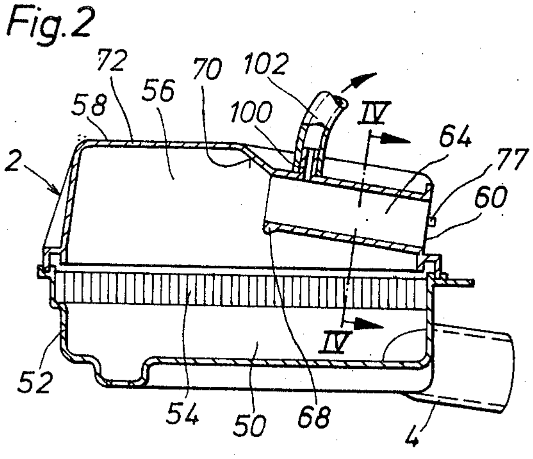
FIG. 2 is a longitudinal section through an air filter having a flow-smoothing pipe according to the invention.

The air drawn through the air induction pipe 8 passes by way of the tube 6 and the inlet spigot 4 of the air filter 2 into a lower chamber 50 thereof (FIG. 2) which is formed by the bottom half 52 of the housing and is covered by a conventional paper filter element 54. Above the paper filter element 54 is a clean air chamber 56 which is formed by the upper half 58 of the housing and is provided with an outlet aperture 60. The two halves 52 and 58 of the housing engage each other at their opposite edges, as shown in FIG. 2, in the manner of a tongue and groove joint and are securely held together by spring clamps 62. The paper filter element 54 may also be clamped therebetween at the joint and has an edge which also serves as a seal.

From the outlet aperture 60 a flow-smoothing pipe 64 extends into the clean air chamber 56 of filter 2, the pipe having a square cross-section, as shown in FIGS. 2 to 5 and having a length which is about 3 to 4 times the length of one side of the square. The outlet aperture 60 is directly connected to the air volumeter 10 with its back pressure valve 14, as shown in FIG. 1. The induction air flow is smoothed in the pipe 64 and, upon entry into the air volumeter 10; that is, approximately at the outlet aperture 60, it is free from turbulence.

The housing of the air filter 2 preferably consists of plastics material and the flow-smoothing pipe 64 may be formed integral with the housing half 58 in a single operation. It is for this reason that the flow-smoothing pipe 64 is made of square cross-section, although a circular cross-section would be more advantageous as regards flow conditions. Similarly, the pipe has not been made conical. It has been found, however, that the configuration of the flow-smoothing pipe shown achieves the desired result to a sufficient extent, thus enabling the advantages of economical production techniques to be exploited.

Figure 5:
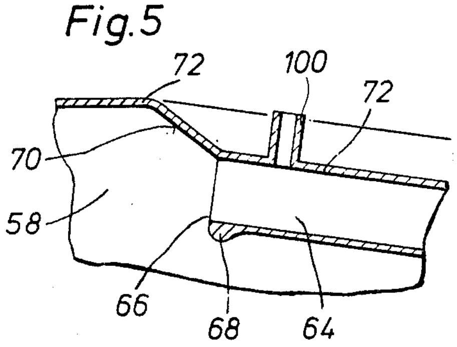
FIG. 5 is a section on the line V—V of FIG. 4.
Figure 4:
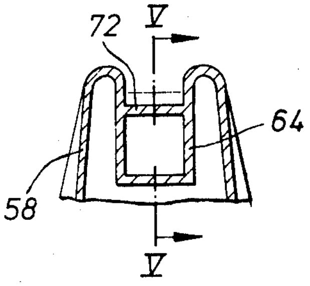
FIG. 4 is a section on the line IV—IV of FIG. 2, to an enlarged scale.
Figure 6:
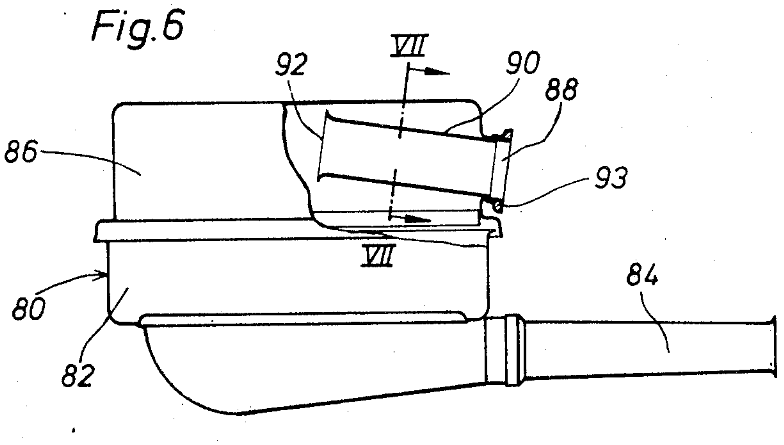
FIG. 6 is a part-sectional elevation of an air filter produced from sheet metal.

The inlet into the flow-smoothing pipe 64 is preferably in the form of a Laval nozzle; that is, a nozzle having an increasing cross-section, this being shown in FIG. 6 in which the flow-smoothing tube has a circular cross-section. With such a configuration less turbulence takes place at the envelope surface so that, right from the commencement of the pipe, the air flow takes place in a more homogeneous manner. However, FIG. 5 shows that the inlet is rectilinear and extends over a sharp edge 66. In this case, also, this is done for technical production reasons, since the flow-smoothing pipe 64 is produced by injection molding or transfer molding methods. However, as will be seen in particular from FIG. 5, the outer edge of the flow-smoothing pipe 64 has a bead-like thickened portion which improves the air flow at the inlet to the pipe.

Figure 3:
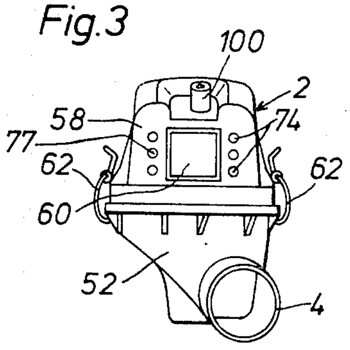
FIG. 3 is a side elevation of the air filter.

At the upper side of the flow-smoothing pipe 64, the inlet adjoins an oblique surface 70 formed by the top 72 of the housing part 58, this construction similarly improving flow. From FIGS. 4 and 5 it can also be seen that the top 72 of the housing 58 which forms a part of the pipe 64 is at a lower level than the remaining portion of the top 72, this construction again being adopted for technical production reasons although there is a certain amount of lost space for the clean air chamber; that is, the space which would exist above the flow-smoothing pipe 64 if the latter extended freely into the clean air chamber as a separate pipe. Preferably, however, the outlet aperture 60 lies lower than the top of the filter, as shown, in order that the air volumeter 10 will not protrude upwardly, substantially above the air filter 2. FIG. 3 shows bores 74 for screws by which the air volumeter 10 is secured to the filter 2, so that the two parts may be combined to form a single unit. In addition, locating pins 77 are provided to engage in corresponding openings, not shown, on the air volumeter, this ensuring that the outlet aperture 60 coincides exactly with the inlet aperture on the air volumeter 10 and thereby avoids the formation of turbulence.

It is also advisable to provide a seal, not shown, at the joint in order to prevent air from leaking in through the joint.

Near the rear end of the flow-smoothing pipe 64 a branch pipe 100 is provided, and a hose 102 which leads to an activated carbon container, not shown, is connected thereto. The branch pipe 100 is sufficiently remote from the air volumeter to avoid the accuracy of the latter being impaired.

Figure 7:
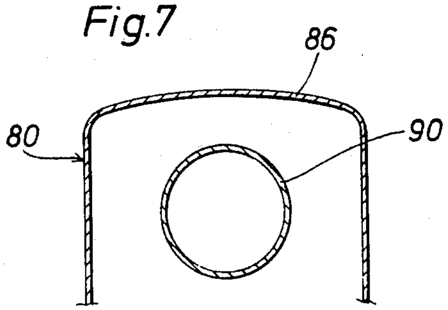
FIG. 7 is a section on the line VII—VII of FIG. 6.

FIG. 6 shows an air filter 80 formed from sheet metal and consisting of an upper housing portion 82 with an induction pipe 84 and a lower housing portion 86. A flow-smoothing pipe 90 formed of sheet metal is inserted in the outlet aperture 88 of the housing portion 86 and is secured thereto by welding. Alternatively, it could be screwed on or, if formed of plastics, could be clipped into position. FIG. 6 shows the application of a seal 93 to the outlet aperture 88. The inlet 92 of the pipe 90 is made funnel-shaped; that is, in the manner of a Laval nozzle. FIG. 7 shows a section through the flow-smoothing pipe 90 and the housing portion 86 and indicates the circular cross-section of the flow-smoothing pipe 90. The attachment of the air volumeter will be effected in a correspondingly appropriate manner.

Figure 8:
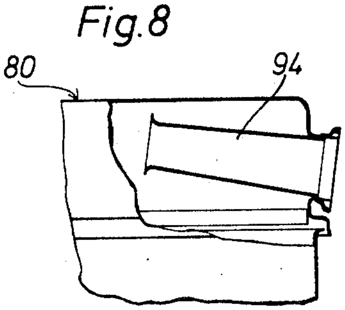
FIG. 8 is a detail of the filter according to FIG. 6, provided with a conical flow-smoothing pipe.

Finally, FIG. 8 shows the conical shaping of the flow-smoothing pipe 94.

The invention is not limited to the configuration of the air filter; also, other constructions than those shown are possible for the construction and arrangement of the flow-smoothing pipe. The invention may also be applicable even when, in the absence of an air volumeter, a homogeneous air flow is desired at the outlet aperture of the filter.

What is claimed is as follows:

1. An air induction assembly for an engine comprising: an air filter housing defining an interior with an inlet and an outlet therein for the passage of air through said housing interior; an air filter element supported in said housing interior between said inlet and said outlet so that air flowing therebetween is filtered; means in said housing for smoothing the flow of air discharged from said housing interior through said outlet including a generally tubular portion which extends from said outlet into said housing interior with an inlet and terminating downstream from said filter element; the ratio between the length and the cross-sectional dimension of said tubular portion falling within the range of approximately 3–4 to 1; said tubular portion being formed integrally with said housing with a portion thereof sharing a wall of said housing; an air volumeter fluidly connected to said outlet immediately downstream from said air smoothing means to receive air therefrom and including a pivotally mounted back-pressure valve member; restoring force producing means operably connected to said valve and normally maintaining it in a closed position during periods when the engine is inactive whereby said valve is moved to a more open position against said restoring force producing means by the flow of air through said outlet, the angular extent of said rotation corresponding to the volume of air flowing therepast; a branch pipe fluidly connected to said flow straightening tubular portion through said shared wall and near said inlet end to permit the passage of fluid therethrough into said tubular portion a sufficient distance upstream from said air volumeter to prevent interference therewith whereby said branch pipe is adapted to be connected to a container of activated carbon for withdrawing fluid from said container.

* * * * *